Feb. 28, 1939.　　　W. S. BRINK　　　2,149,205
TIRE RIM
Filed Jan. 7, 1937　　　6 Sheets-Sheet 1

INVENTOR
Winfield S. Brink
BY
Albert L. Ely
ATTORNEY

Feb. 28, 1939.  W. S. BRINK  2,149,205
TIRE RIM
Filed Jan. 7, 1937   6 Sheets-Sheet 3

INVENTOR
Winfield S. Brink
BY Albert L. Ely
ATTORNEY

Feb. 28, 1939.  W. S. BRINK  2,149,205
TIRE RIM
Filed Jan. 7, 1937   6 Sheets-Sheet 4

INVENTOR
Winfield S. Brink

BY Albert L. Ely
ATTORNEY

Feb. 28, 1939.   W. S. BRINK   2,149,205
TIRE RIM
Filed Jan. 7, 1937   6 Sheets-Sheet 5
FIG. 8.
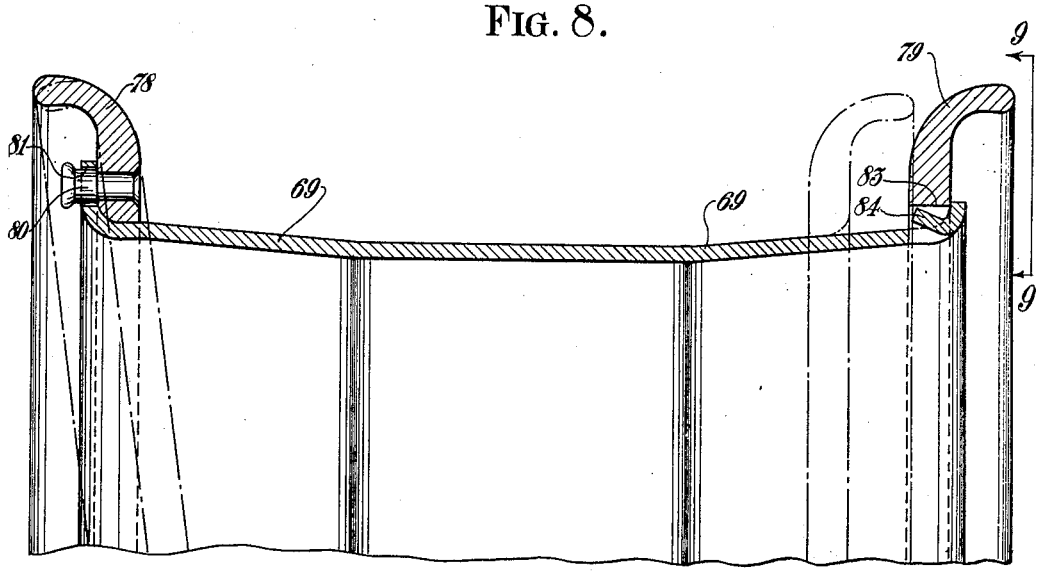
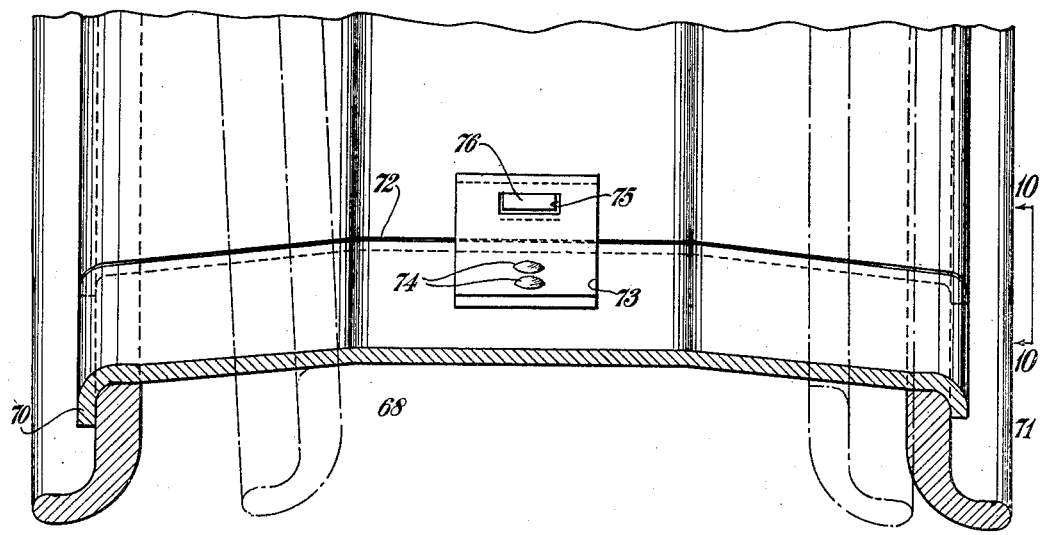
FIG. 9.    FIG. 10.
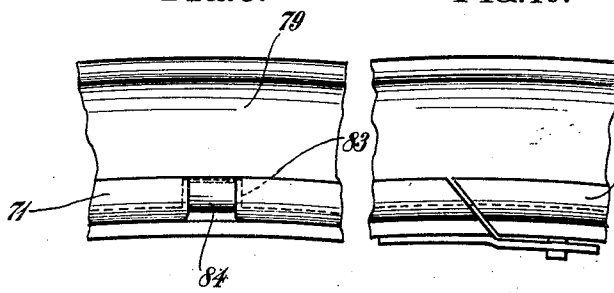
INVENTOR
*Winfield S. Brink*
BY *Albert L. Ely*
ATTORNEY Feb. 28, 1939. W. S. BRINK 2,149,205
TIRE RIM
Filed Jan. 7, 1937 6 Sheets-Sheet 6

INVENTOR
Winfield S. Brink
BY
Albert R. Ely
ATTORNEY

UNITED STATES PATENT OFFICE 2,149,205

TIRE RIM

Winfield S. Brink, Akron, Ohio, assignor, by mesne assignments, to The Firestone Tire & Rubber Company, Akron, Ohio, a corporation of Ohio Application January 7, 1937, Serial No. 119,450

14 Claims. (Cl. 152—411)

This invention relates to tire rims for use with pneumatic tires, and more especially it relates to tire rims especially adapted for supporting low pressure pneumatic tires such as commonly are used on tractors for agricultural and other purposes.

Due to the high torque to which tractor tires of the character mentioned frequently are subjected, such tires slip angularly about the axis of the rim unless means are taken to prevent it, and to this end the bead-seating portions of the tire-rims have been flared or sloped and the inside diameter of the tire made smaller than said bead seats so that the tire beads have been wedged or stretched onto the bead seats as they are moved laterally outwardly during the inflation of the tire. In removing such tires from their rims, the bead portions of the tires require first to be moved off the bead-seating portions of the rims, which, in the case of rims heretofore provided, has been a relatively difficult task due to the tenacity with which the tire grips the rim due to the tension in the tire beads. In the present invention this difficulty has been overcome by the provision of side rings on each side of the rim, which side rings are movable laterally over the respective bead-seating portions of the rim to facilitate the removal of the tire beads therefrom.

The chief objects of the invention are to provide improved tire rims having tapered bead-seating regions and laterally movable side rings at the lateral margins of said regions and movable laterally thereover; to provide rims of the character mentioned wherein the movable side rings are removable from the rim, or are permanently connected thereto; and to provide a structure of the character mentioned including means for preventing rotational movement of the removable ring about the axis of the rim. A further object is to embody the invention in tire rims that have endless removable side rings, and in tire rims having split, removable side rings; and to embody the invention both in endless tire rims, and in tire rims that are transversely split. Other objects will be manifest as the specification proceeds.

Of the accompanying drawings:

Figure 8 is a fragmentary diametric section of a transversely split tire rim constituting another embodiment of the invention;

Figure 9 is a fragmentary side elevation thereof as viewed from the line 9—9 of Figure 8;

Figure 10 is a fragmentary side elevation thereof as viewed from the line 10—10 of Figure 8;

Figure 1:
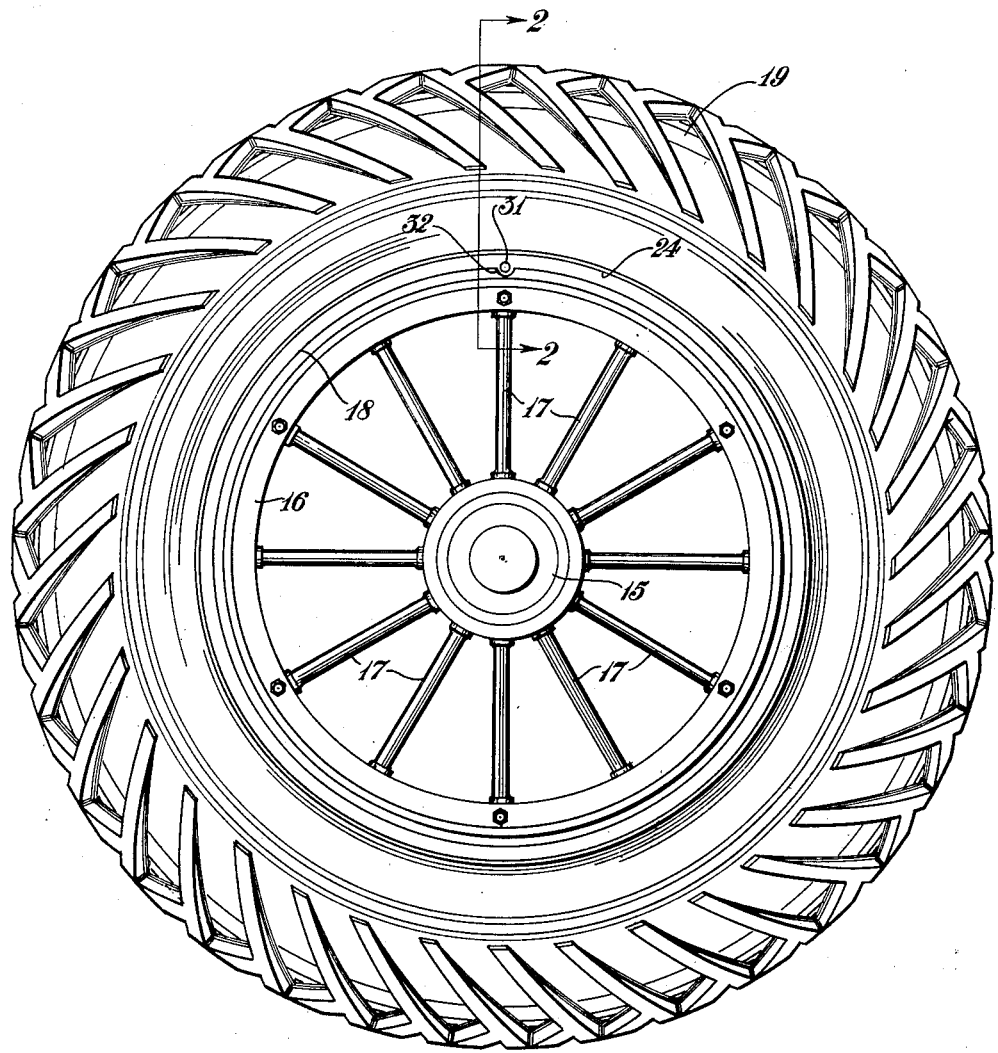
Figure 1 is a side elevation of a vehicle wheel comprising the improved tire rim, in its preferred form, and a pneumatic tire mounted thereon.

Referring now to Figure 1 of the drawings, there is shown a vehicle wheel comprising a hub 15, a felloe 16, a plurality of spokes 17, 17 connecting said hub and felloe, and an improved tire rim, generally designated 18, mounted upon said felloe. The tire rim 18 carries a pneumatic tire 19, the latter including the usual inflatable inner tube 20, Figure 2.

Figure 2:
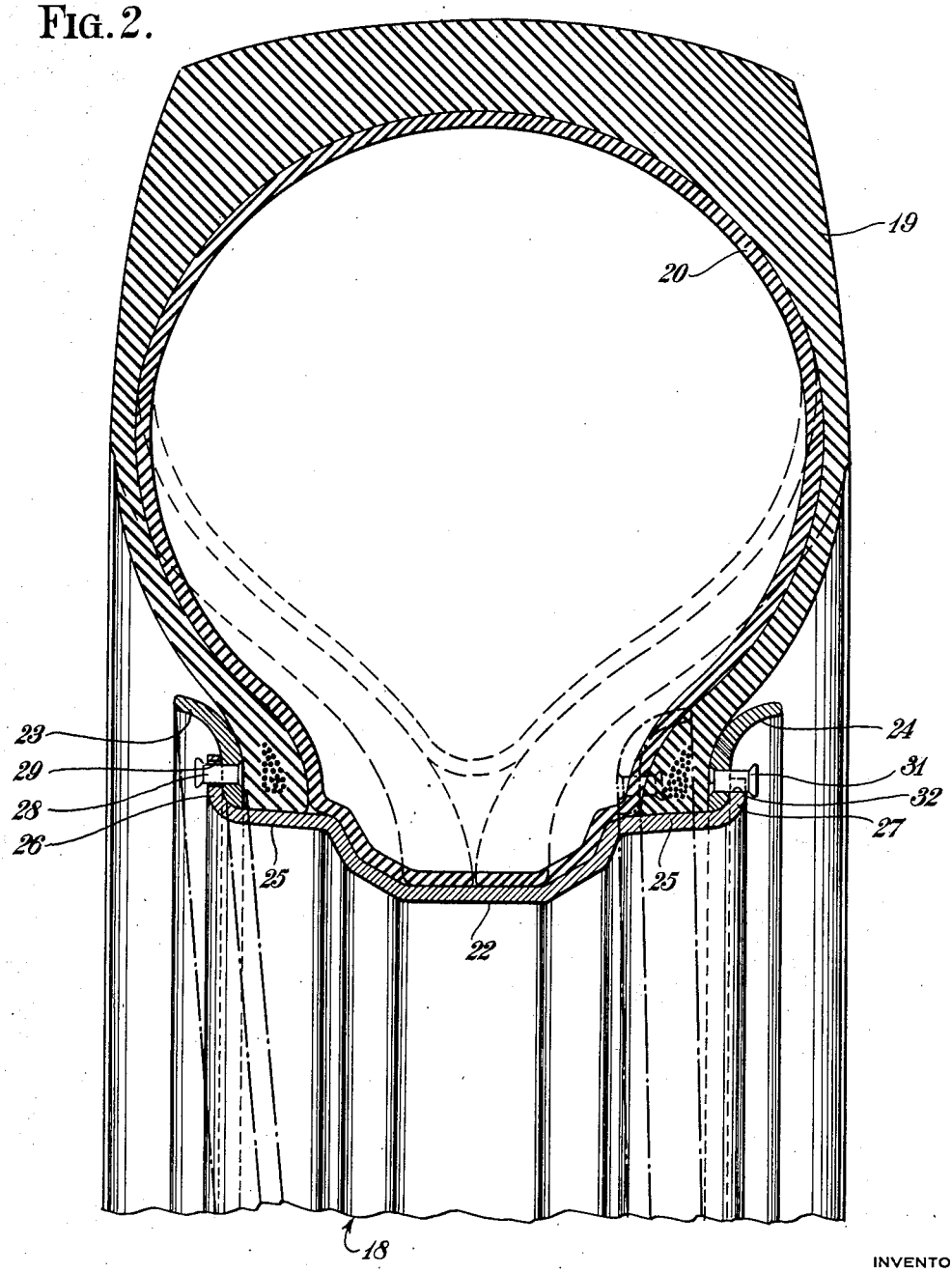
Figure 2 is a section, on a larger scale, of the tire and tire rim, taken on the line 2—2 of Figure 1.

As shown in Figure 2, the tire rim 18 comprises a rim-base 22, a peripheral, endless side ring 23 permanently attached thereto at one margin thereof, and an endless, removable side ring 24 mounted upon the other marginal portion thereof. The rim-base 22 is of the drop-center type having a relatively deep circumferential well into which the bead portion of a tire may be positioned (as shown in broken lines) to facilitate the mounting of the tire on the rim and the dismounting thereof from the rim. Extending laterally from each side of the circumferential well of the rim-base are respective bead-seating portions 25, 25 that slope or flare outwardly toward their lateral margins, the latter being formed with respective outwardly extending radial flanges 26, 27, of which flange 27 is of somewhat lower height to permit the removal of side ring 24 thereover. Thus the portions 25 are of frusto-conical shape with their largest diameter remote from the central well of the rim-base, and the inner periphery or bead-portions of the tire are complementally sloped, and are of smaller inside diameter than the greatest outside diameter of the rim-portions 25 so that they are wedged onto the rim, under substantial tension, when seated in their normal operative positions as shown in full lines in Figure 2. The side rings 23, 24 are arcuate in transverse section and designed to abut the inner lateral faces of the flanges 26, 27, respectively, the inner periphery of each ring being suitably rounded to fit the radius at the juncture of portions 25 and said flanges.

Both side-rings 23, 24 are of such size as to slide readily in an axial direction over the bead-seating portions 25 of the rim-base, and because of the slope of the latter they may be tilted at an angle to the plane of the rim. Ring 23 is permanently attached to the rim-base by means of a headed stud 28 that is riveted to the ring and projects laterally therefrom through an aperture 29 formed in the adjacent flange 26. The aperture 29 is considerably larger than the stud 28 to permit ample play of the latter, and the head on the free end of the stud is larger than said aperture to prevent removal of the ring from the rim-base. Furthermore, the stud is of sufficient length to allow the ring to be moved laterally, in its own plane, to start the adjacent tire bead off its rim-seat 25, and the taper of the latter permits that portion of the ring that is diametrically opposite the stud 28 to be swung laterally substantially to the central well of the rim to further remove the tire bead from its seat. The stud 28 also serves the purpose of preventing the ring 23 from turning angularly about the axis of the rim.

Removable side ring 24 is substantially identical to side ring 23, and is provided with a headed stud 31 that projects laterally therefrom and engages in a notch 32 formed in the outer periphery of flange 27. The ring 24 may be moved relatively of the rim-base 22 to the same extent and in the same manner as the ring 23, and in addition, by utilizing the central well of the rim, may be entirely removed from the rim-base in the usual manner. The stud 31 and slot 32 prevent angular movement of the side ring 24 about the axis of the rim, but do not hamper the removal of the ring from the rim-base.

The invention facilitates the removal of the tightly wedged tire beads from the bead-seats of the rim, and achieves the other objects set out in the foregoing statement of objects.

Figure 3:
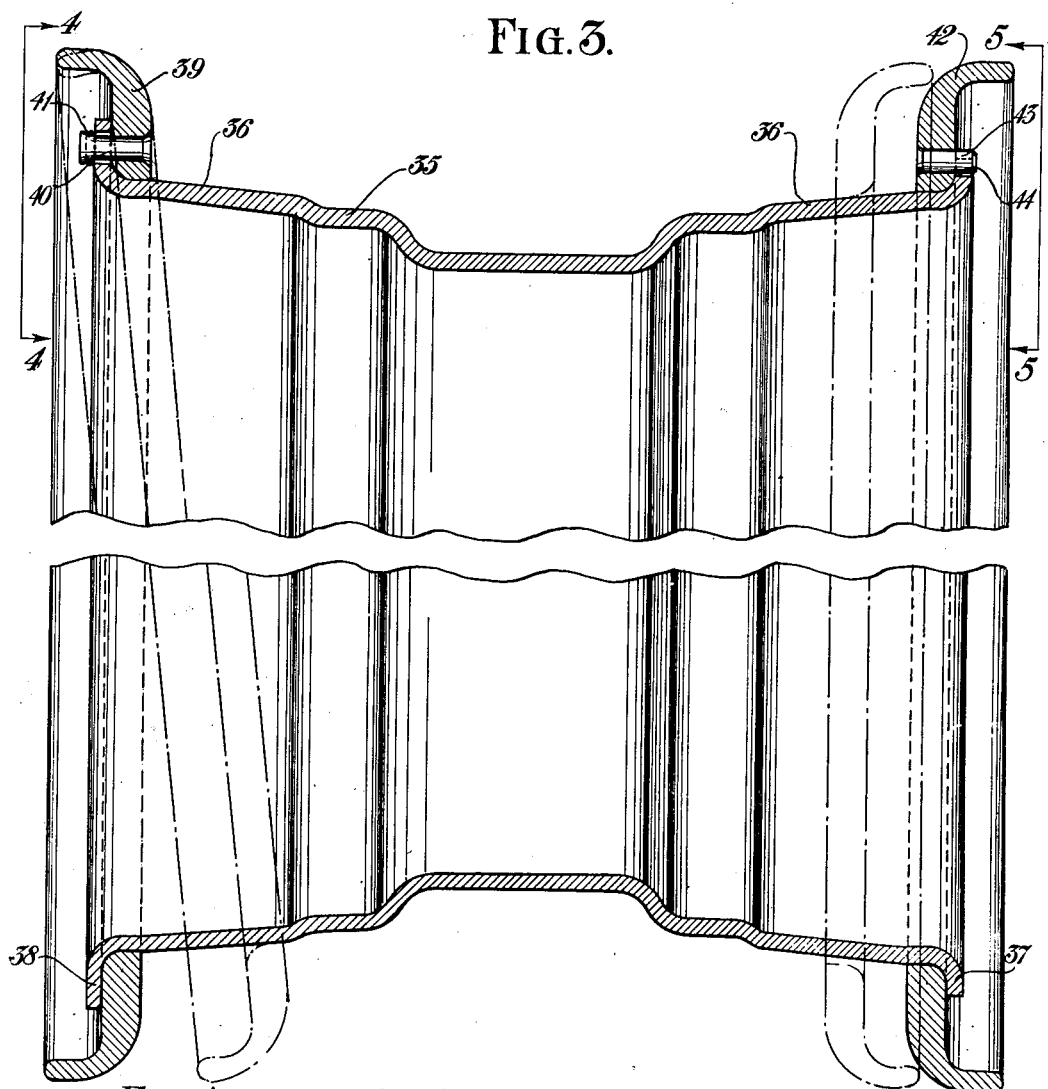
Figure 3 is a fragmentary diametric section of a tire rim constituting another embodiment of the invention.
Figure 4:
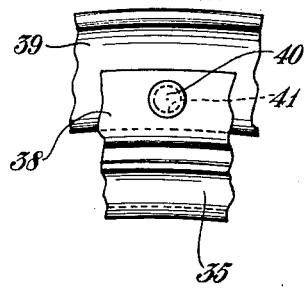
Figure 4 is a fragmentary side elevation thereof as viewed from the line 4—4 of Figure 3.
Figure 5:
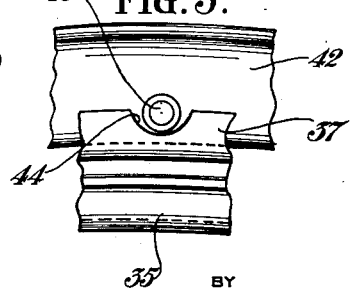
Figure 5 is another fragmentary side elevation as viewed from the line 5—5 of Figure 3.

The embodiment of the invention shown in Figures 3 to 5 inclusive comprises a drop-center rim-base 35 that has a relatively shallow central circumferential well. At each side of said well are sloped or tapered bead seating portions 36, 36, one of which is formed with a relatively low radial marginal flange 37, the other being formed with a marginal flange 38 that is somewhat higher than flange 37. Loosely mounted upon bead-seating portion 36 and normally in abutting relation to flange 38 is an endless, transversely arcuate, side ring 39 that is permanently secured to said flange by means of a laterally projecting, headed stud 40. The latter is riveted to said ring 39 and extends through an aperture 41 in the flange 38, the arrangement being identical with that of the previously described embodiment. Loosely mounted upon the other bead-seating portion 36 and normally abutting flange 37 thereon is a removable endless side-ring 42. The side ring 42 has mounted therein a laterally projecting stud 43 that is engageable in a notch 44 formed in the perimeter of the flange 37, the arrangement being such as to prevent rotational movement of the ring 42 about the axis of the rim. Since the stud 43 is without a head, it does not interfere with inward lateral movement of the ring 42, and the latter may be moved, in its own plane, a sufficient distance inwardly to assure that the bead portions of a tire on the rim are completely free of the bead-seating portions 36 of the rim-base. Thereafter the ring 42 may be removed from the rim-base by utilizing the central well of the rim in the usual, well known manner.

Figure 6:
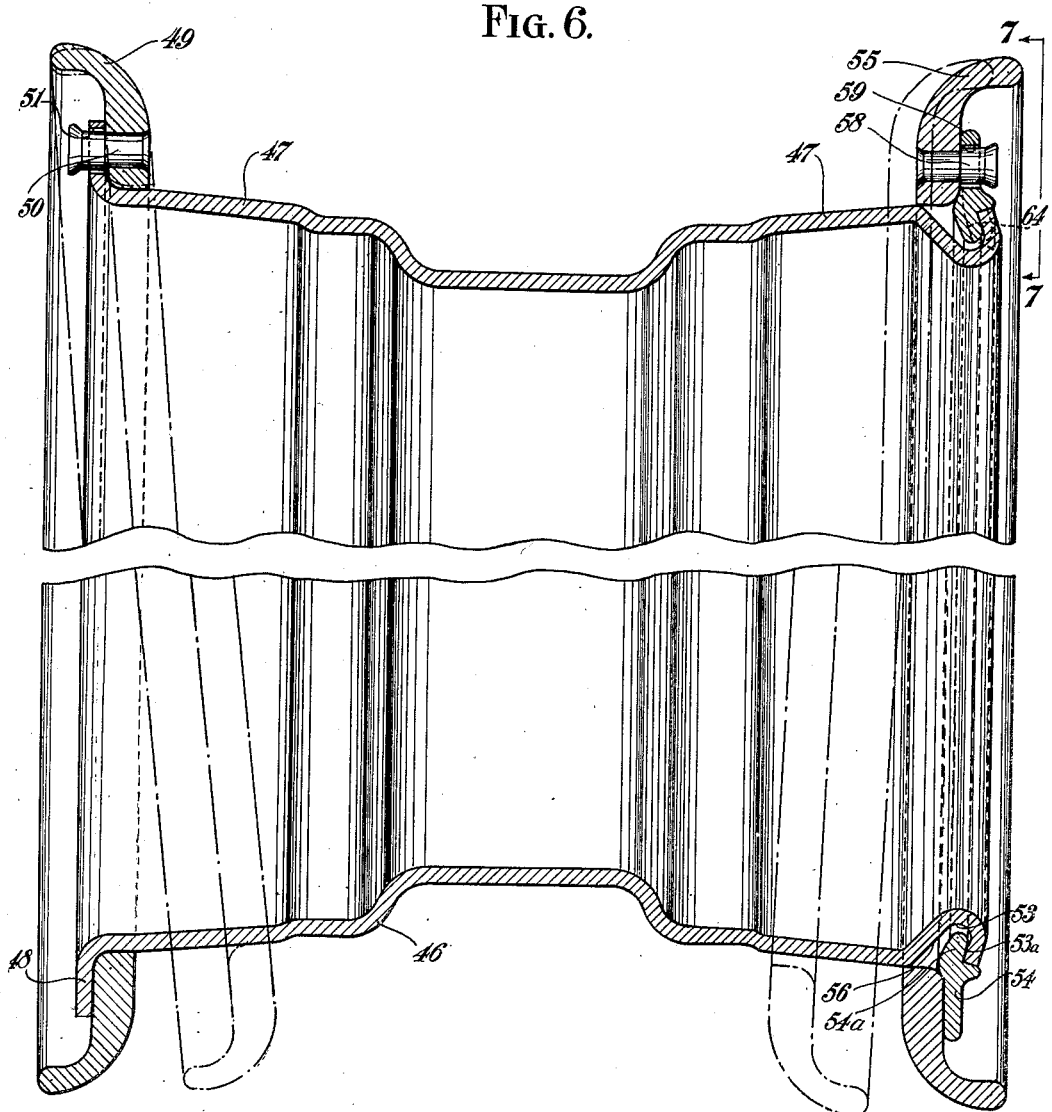
Figure 6 is a fragmentary diametric section of a tire rim having an endless side ring that is retained in place by a split ring mounted in a gutter on one side of the rim, the structure constituting another embodiment of the invention.
Figure 7:
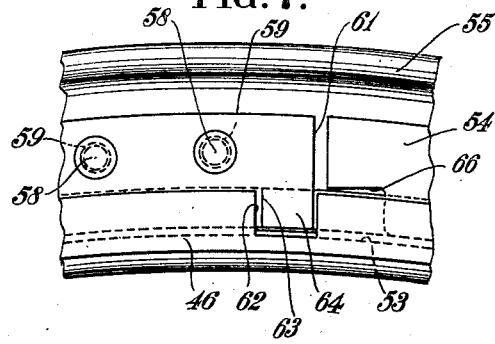
Figure 7 is a fragmentary side elevation thereof as viewed from the line 7—7 of Figure 6.

The embodiment of the invention shown in Figures 6 and 7 comprises a shallow, drop-center rim-base 46 having sloped or tapered bead-seating portions 47, 47, of which the portion 47 on one side of the rim-base is formed with a radially extending marginal flange 48. Loosely mounted upon the rim-base and normally abutting flange 48 is an endless side-ring 49. The latter is permanently secured to flange 48 by means of a headed stud 50 that extends through an aperture 51 in said flange, as in the embodiment of the invention previously described.

The bead-seating portion 47 on the other side of the central well of rim-base 46 has its marginal portion formed with a circumferential gutter 53 in which is receivable a transversely split locking ring 54 that retains an endless side-ring 55 upon the rim. That portion of rim structure that defines the gutter 53 is disposed below or radially inwardly of the largest outside diameter of the adjacent bead-seating portion 47 and inside diameter of the ring 55 so that the latter may pass freely over said gutter. The gutter 53 is provided with an overhang 53a beneath which a rib 54a of the locking ring seats when a tire on the rim is inflated. A clearance, indicated at 56, is provided between the locking-ring-rib 54a and the gutter 53 so that when a tire on the rim is deflated and the tire and side ring 55 are pushed laterally over the rim-base, the locking ring 54 may be sprung out of the gutter.

The side ring 55 is permanently secured to the locking ring 54 by means of a pair of laterally projecting headed studs 58, 58 that are disposed side by side circumferentially of the ring and extend through respective apertures 59, 59 in the locking ring 54, said apertures being somewhat larger than the body portion of said studs. The studs 58 constitute an interlock between the locking ring 54 and side ring 55 and prevent the latter from turning rotationally about the axis of the rim, yet permitting that portion of the side ring that is diametrically opposite the studs to be swung toward the gutter of the rim, as indicated in broken lines in the drawing, to loosen a tire from the rim.

The studs 58 traverse the locking ring 54 adjacent the split 61 therein (see Fig. 7). In order to prevent angular movement of the locking ring 54 about the axis of the rim, there is provided an interlock between said locking ring and that portion of the rim-base structure that defines the gutter 53, and to this end the latter is formed with a deep notch or recess 62. That end portion of the locking ring 54 that includes the apertures 59 is radially split or slotted at 63, adjacent the end of the ring, and outwardly from the inner periphery thereof about half way through the ring, and said slotted portion is offset or outwardly bent, as shown at 64, so as to engage in notch 62 when the locking ring is in the operative position it assumes when an inflated tire is on the rim.

The opposite end of the locking ring 54, on the other side of the slot or split 61, has its inner corner cut away or notched at 66, which notch extends above the gutter 53 and provides a space for receiving a suitable prying tool by means of which the free end of the locking ring may be lifted out of the gutter. Thereafter the remainder of the locking ring may be progressively sprung out of the gutter, after which the attached side ring may be moved laterally off the rim. The procedure is reversed when it is desired to mount the side-ring upon the rim.

The embodiment of the invention shown in Figures 8 to 10 inclusive comprises a tire-rim-base 68 comprising a cylindrical medial portion and sloped or flared bead-seating portions 69, 69 extending laterally from opposite sides thereof. The outer margin of each sloped portion 69 is formed with an outwardly extending radial flange, designated 70 and 71, of which flange 70 is somewhat higher than flange 71. The rim-base 68 is transversely divided or split at 72 so that it may be collapsed by sliding one end portion past the other end portion, thereby reducing the diameter of the base for the purpose of mounting a tire thereon or removing a tire therefrom. Any suitable latching means may be provided for retaining the rim-base in expanded or operative position, that shown herein comprising a plate 73 that is secured at one end to an end of the rim-base by rivets 74 and spans the split 72 in the base, the other end portion of said plate being formed with a slot or aperture 75 that receives a lug or tongue 76 struck out from the other end portion of the rim-base.

Mounted upon the bead-seating portions 69 of the rim-base, in laterally abutting relation to the flanges 70, 71 thereof, are respective transversely arcuate, endless side rings 78, 79. The ring 78 is permanently attached to flange 70 by means of a headed stud 80 that is mounted in the ring and projects laterally therefrom through a somewhat larger aperture 81 formed in the said flange 70. The arrangement permits that portion of the ring that is diametrically opposite stud 80 to be swung toward the medial plane of the rim-base for the purpose of loosening the adjacent tire bead, in the same manner as hereinbefore described. The interlock of the ring and rim-base also provides driving connection between the two so that the ring does not turn angularly about the axis of the rim. The arrangement is especially advantageous in the case of split rims since it obviates the necessity of securing accurate registry of the respective parts during the assembling of the rim when mounting a tire thereon.

The side ring 79 on the opposite side of the ring fits relatively loosely thereon against flange 71, and is endless. At one point in its inner periphery the ring 79 is formed with a notch 83 in which is receivable a lug 84 struck radially outwardly from the rim-base at the juncture of bead-seating portion 69 and flange 71 thereof. The mechanical interlock of the rim-base and the side ring through the agency of the lug 84 prevents movement of the ring relatively of the rim-base rotatably about the axis of the rim.

Figure 11:
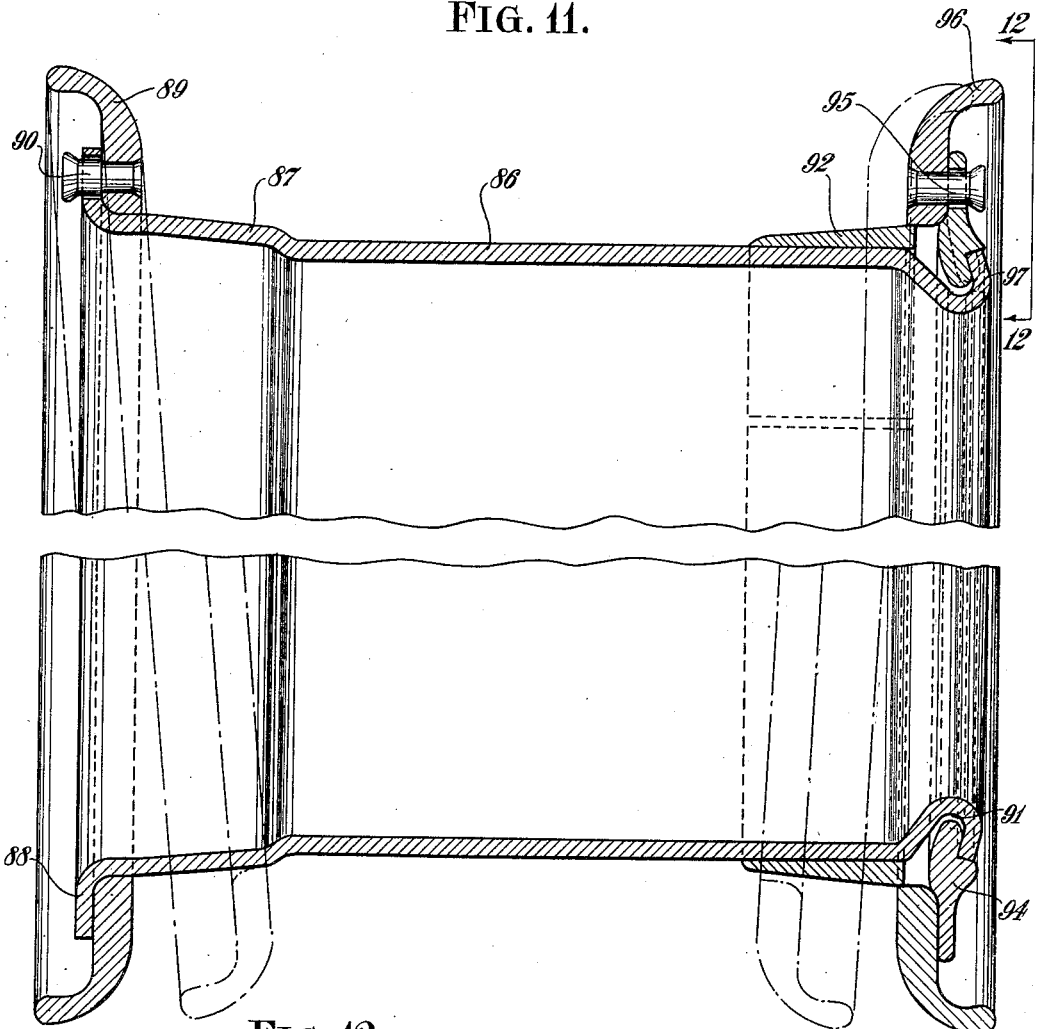
Figure 11 is a fragmentary diametric section of still another embodiment of the invention.
Figure 12:
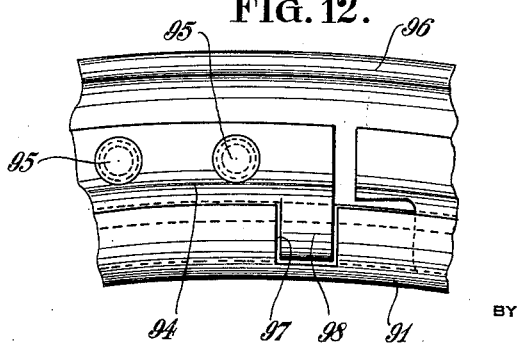
Figure 12 is a fragmentary side elevation thereof as viewed from the line 12—12 of Figure 11.

The embodiment of the invention shown in Figures 11 and 12 in many respects is similar to that shown in Figures 6 and 7 to which reference is directed for similar details of construction. As shown in Figure 11, the rim comprises an endless rim-base 86 of general cylindrical form, one side of said rim-base being formed with a tire-bead-seating portion 87 that is sloped or flared, and formed with an outwardly extending marginal flange 88. An endless side ring 89 is mounted upon the rim-base in abutting relation to flange 88 and permanently secured to the latter by a headed stud 90 in the manner hereinbefore set forth. The rim-base 86 is of uniform diameter from the bead-seating region 87 on one side thereof, substantially to its opposite margin where it is formed with a radially inwardly disposed marginal gutter 91. Mounted upon the cylindrical portion of the rim-base, adjacent gutter 91, is a relatively wide split, band or ring 92, the outer peripheral face of which is sloped or tapered toward the margin thereof that is remote from gutter 91. The slope of the band 92 is symmetrical with the slope of rim portion 87, said band thus constituting a bead-seat for one of the beads of a tire that may be mounted upon the rim.

Mounted in the gutter 91 is a split locking ring 94, and permanently connected thereto by headed studs 95, 95 is an endless side ring 96, the latter being of such inside diameter as to fit loosely about the greatest outside diameter of the band 92. The locking ring 94 is mechanically interlocked with rim-base 86 through the agency of a notch or slot 97 formed in the wall of the gutter 91, and a lug 98 struck out from ring 94 and receivable in said notch. The function and operation of locking ring 94 and side ring 96 is the same as that of similar members of the embodiment shown in Figure 6.

In the operation of this embodiment of the invention, the tire thereon is removed by forcing and tilting side ring 96 laterally, as indicated in broken lines in Figure 11, to push the tire bead off band 92, after which the locking ring 94 is removed from gutter 91, and the locking ring and side ring 96 removed as a unit from the rim-base. Thereafter, tapered band 92 may be moved laterally off the rim-base, and the tire may be removed from the same side of the rim-base after its other bead is loosened from rim-portion 87 by tilting of the other side ring 89. The sequence of operations is reversed in the mounting of a tire on the rim.

Other modification may be resorted to without departing from the spirit of the invention or the scope of the appended claims.

What is claimed is:

1. In a tire rim, the combination of a circular rim-base comprising sloped regions for wedging engagement with respective beads of a tire thereon, and endless side rings on said rim-base at opposite lateral margins thereof, said rings being movable laterally toward each other for loosening the said tire beads from the rim-base.

2. In a tire rim, the combination of a circular rim-base comprising sloped regions thereon for wedging engagement with respective beads of a tire thereon, endless side rings on said rim-base at opposite lateral margins thereof and movable laterally toward each other for loosening the said tire-beads from the rim-base, and means providing interengagement of the rim-base and side rings for preventing angular movement of the rings about the axis of the rim relatively of said rim-base.

3. A combination as defined in claim 2 in which one of the side rings at least is removable from the rim-base.

4. In a tire rim, the combination of a circular rim-base comprising sloped regions thereon for wedging engagement with respective beads of a tire thereon, endless side rings on said rim-base at opposite lateral margins thereof and movable angularly relatively of the plane of the rim for loosening the said tire beads from the rim-base, one of said rings at least being removable from the latter.

5. In a tire rim, the combination of a circular rim-base comprising sloped regions thereon for wedging engagement with respective beads of a tire thereon, endless side rings on said rim-base at opposite lateral margins thereof and movable laterally toward each other for loosening said tire beads from the rim-base, one of said side rings at least being removable from the rim-base, and a removable locking ring mounted upon the rim-base and retaining the said removable side ring thereon.

6. A combination as defined in claim 5 including means permanently and loosely connecting the locking ring to the side ring.

7. A combination as defined in claim 5 including means permanently and loosely connecting the locking ring to the side ring, and means interlocking the rim-base and locking ring to prevent angular movement of the latter about the axis of the rim.

8. In a tire rim the combination of a circular rim-base comprising sloped regions thereon for wedging engagement with the beads of a tire thereon, endless side rings on said rim-base at opposite lateral margins thereof and movable angularly relatively of the plane of the rim for loosening the said tire beads from the rim-base, one of said side rings at least being removable from the rim-base, there being a circumferential gutter on the margin of the rim-base, a removable locking ring mounted in said gutter, and means permanently connecting said locking ring with the removable side ring.

9. A combination as defined in claim 8 including means projecting from the locking ring and engageable in a notch in the gutter structure for preventing movement of the locking ring angularly about the axis of the rim.

10. A combination as defined in claim 8 in which the sloped region of the rim-base adjacent the gutter thereof consists of a circular band that is removably mounted upon the rim-base and has a sloped outer peripheral face.

11. In a tire rim, the combination of a circular rim-base comprising sloped regions thereon for wedging engagement with respective beads of a tire thereon, and endless side rings on said rim-base at opposite lateral margins thereof and movable laterally toward each other for loosening said tire beads from the rim-base, one of said side rings at least being permanently connected to said rim-base.

12. In a tire rim, the combination of a circular rim-base comprising sloped regions thereon for wedging engagement with respective bead of a tire thereon, endless side rings on said rim-base at opposite lateral margin thereof and movable laterally toward each other for loosening said tire beads from the rim-base, one of said side rings at least being permanently connected to the tire-rim, said connection comprising an outwardly extending circumferential flange on the margin of one of the sloped regions of the rim-base, and a headed stud mounted upon said side ring and extending laterally through an aperture in said flange.

13. In a tire rim, the combination of a circular rim base comprising sloped regions thereon for wedging engagement with respective beads of a tire thereon, and formed with an outwardly extending circumferential flange on the margin of at least one of said sloped regions, an endless side ring loosely mounted upon the rim base in abutting relation to said flange, a headed stud mounted upon said side ring and extending laterally through an aperture in said flange for permanently connecting the ring to the rim base, and for providing driving connection therebetween, and a removable endless side ring mounted upon the opposite marginal portion of the rim base, the rim base having a central circumferential well or drop center, and the removable side ring being arranged to be removed from the rim base through the agency of said central well.

14. In a tire rim, the combination of a circular rim base comprising sloped regions thereon for wedging engagement with respective beads of a tire thereon, and formed with an outwardly extending circumferential flange on the margin of at least one of said sloped regions, an endless side ring loosely mounted upon the rim base in abutting relation to said flange, a headed stud mounted upon said side ring and extending laterally through an aperture in said flange for permanently connecting the ring to the rim base, and for providing driving connection there between, and a removable endless side ring mounted upon the opposite marginal portion of the rim base, the rim base being transversely split and being collapsible to permit removal of one side ring and a tire therefrom.

WINFIELD S. BRINK.